(12) United States Patent
Okonogi et al.

(10) Patent No.: US 10,267,253 B2
(45) Date of Patent: Apr. 23, 2019

(54) FUEL INJECTION SYSTEM FOR INTERNAL COMBUSTION ENGINE

(71) Applicant: Hitachi Automotive Systems, Ltd., Hitachinaka-shi, Ibaraki (JP)

(72) Inventors: Atsushi Okonogi, Hitachinaka (JP); Takao Fukuda, Hitachinaka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 15/309,958

(22) PCT Filed: May 7, 2015

(86) PCT No.: PCT/JP2015/063163
§ 371 (c)(1),
(2) Date: Nov. 9, 2016

(87) PCT Pub. No.: WO2015/174310
PCT Pub. Date: Nov. 19, 2015

(65) Prior Publication Data
US 2017/0138289 A1 May 18, 2017

(30) Foreign Application Priority Data

May 13, 2014 (JP) ................. 2014-099208

(51) Int. Cl.
*F02D 41/20* (2006.01)
*F02D 41/22* (2006.01)
(Continued)

(52) U.S. Cl.
CPC ............ *F02D 41/20* (2013.01); *F02D 41/22* (2013.01); *F02D 41/221* (2013.01);
(Continued)

(58) Field of Classification Search
CPC ..... F02D 2041/2003; F02D 2041/2006; F02D 2041/201; F02D 2041/2013; F02D 2041/2086; F02D 2041/224
See application file for complete search history.

(56) References Cited

U.S. PATENT DOCUMENTS 4,479,161 A * 10/1984 Henrich .............. F02D 41/3005
123/478
4,486,703 A * 12/1984 Henrich .............. F02D 41/3005
323/222
(Continued)

FOREIGN PATENT DOCUMENTS

DE 10 2007 000 064 A1 8/2007
JP 2004-44429 A 2/2004
(Continued)

OTHER PUBLICATIONS

International Search Report (PCT/ISA/210) issued in PCT Application No. PCT/JP2015/063163 dated Jul. 28, 2015 with English translation (Two (2) pages).
(Continued)

*Primary Examiner* — Sizo B Vilakazi
*Assistant Examiner* — Kevin R Steckbauer
(74) *Attorney, Agent, or Firm* — Crowell & Moring LLP

(57) ABSTRACT

A booster circuit installed in a fuel injection device of an internal combustion engine, wherein malfunctions and characteristic changes of the booster circuit are detected, among which the detection distinguishes between decreases in capacity caused by deterioration or broken wires in a booster capacitor, and failures of a current monitor circuit, coil, externally connected fuel injection valve, and other components. The range of decrease in boost voltage when the fuel injection valve is opened is monitored, as is the range of increase per switch performed in order to restore the boost voltage. This makes it possible to detect malfunctions and characteristic changes of the booster circuit.

7 Claims, 8 Drawing Sheets

(51) Int. Cl.
  *F02D 41/30* (2006.01)
  *F02D 41/32* (2006.01)
  *F02D 45/00* (2006.01)
(52) U.S. Cl.
  CPC ......... *F02D 41/3005* (2013.01); *F02D 41/32* (2013.01); *F02D 45/00* (2013.01); *F02D 2041/201* (2013.01); *F02D 2041/2003* (2013.01); *F02D 2041/2006* (2013.01); *F02D 2041/2013* (2013.01); *F02D 2041/2086* (2013.01); *F02D 2041/224* (2013.01); *Y02T 10/40* (2013.01)

(56) References Cited

U.S. PATENT DOCUMENTS

| | | | | |
|---|---|---|---|---|
| 4,774,624 | A * | 9/1988 | Qualich | F02D 41/20 123/490 |
| 5,203,868 | A * | 4/1993 | Ono | F02D 41/20 324/546 |
| 6,505,609 | B1 * | 1/2003 | Biester | F02D 41/20 123/479 |
| 6,853,201 | B2 * | 2/2005 | Hirn | F02D 41/2096 123/490 |
| 6,880,530 | B2 * | 4/2005 | Oyama | F02D 41/20 123/479 |
| 7,252,072 | B2 * | 8/2007 | Slater | F02D 41/20 123/479 |
| 7,640,918 | B2 * | 1/2010 | Perryman | F02D 41/2096 123/479 |
| 7,945,415 | B2 * | 5/2011 | Perryman | F02D 41/2096 123/339.15 |
| 7,966,871 | B2 * | 6/2011 | Perryman | F02D 41/2096 73/114.45 |
| 7,987,044 | B2 * | 7/2011 | Eto | F02D 41/20 123/478 |
| 8,248,074 | B2 * | 8/2012 | Perryman | F02D 41/2096 324/378 |
| 9,097,225 | B2 * | 8/2015 | Qiao | F02M 51/00 |
| 9,261,038 | B2 * | 2/2016 | Nishida | F02D 41/20 |
| 9,901,378 | B2 * | 2/2018 | Dauster | A61B 17/7076 |
| 2002/0000218 | A1 * | 1/2002 | Rueger | F02D 41/2096 123/498 |
| 2002/0011762 | A1 * | 1/2002 | Klenk | F02D 41/2096 310/316.03 |
| 2002/0041475 | A1 * | 4/2002 | Rueger | F02D 41/2096 361/91.1 |
| 2003/0078744 | A1 * | 4/2003 | Hirn | F02D 41/2096 702/64 |
| 2004/0118384 | A1 * | 6/2004 | Oyama | F02D 41/20 123/479 |
| 2005/0051139 | A1 * | 3/2005 | Slater | F02D 41/20 123/479 |
| 2007/0227506 | A1 * | 10/2007 | Perryman | F02D 41/2096 123/479 |
| 2008/0319699 | A1 * | 12/2008 | Perryman | F02D 41/2096 702/115 |
| 2009/0121724 | A1 * | 5/2009 | Perryman | F02D 41/2096 324/522 |
| 2009/0159047 | A1 * | 6/2009 | Eto | F02D 41/20 123/435 |
| 2009/0243574 | A1 * | 10/2009 | Mayuzumi | F02D 41/20 323/282 |
| 2009/0314073 | A1 * | 12/2009 | Perryman | F02D 41/2096 73/114.45 |
| 2010/0152994 | A1 * | 6/2010 | Huber | F02D 41/1495 701/103 |
| 2010/0199752 | A1 | 8/2010 | Lucido et al. | |
| 2014/0067233 | A1 * | 3/2014 | Nishida | F02D 41/20 701/103 |
| 2014/0190453 | A1 * | 7/2014 | Qiao | F02M 51/00 123/478 |
| 2015/0128912 | A1 * | 5/2015 | Nishida | F02D 41/20 123/480 |
| 2016/0208725 | A1 * | 7/2016 | Fukuda | F02D 41/20 |
| 2017/0268449 | A1 * | 9/2017 | Nagata | F02D 41/20 |
| 2017/0328293 | A1 * | 11/2017 | Yamanaka | F02D 41/20 |
| 2017/0335789 | A1 * | 11/2017 | Kiuchi | F02D 41/20 |

FOREIGN PATENT DOCUMENTS

| | | |
|---|---|---|
| JP | 3635751 B2 | 4/2005 |
| JP | 2007-113547 A | 5/2007 |
| JP | 2011-247192 A | 12/2011 |
| JP | 2011-254620 A | 12/2011 |
| WO | WO 95/07409 A1 | 3/1995 |

OTHER PUBLICATIONS

Japanese-Written Opinion (PCT/ISA/237) issued in PCT Application No. PCT/JP2015/063163 dated Jul. 28, 2015 (Five (5) pages).
Extended European Search Report issued in counterpart European Application No. 15792776.5 dated Dec. 15, 2017 (seven pages).
Cover page of EP 0 668 963 A1 published on Aug. 30, 1995 (one page).

* cited by examiner

FIG. 9

| COMPONENT | CHANGE | CHANGE OF VOLTAGE ① | CHANGE OF VOLTAGE ② |
|---|---|---|---|
| BOOST CAPACITOR 65 CAPACITY VALUE | LARGE | SMALL | SMALL |
| | SMALL | LARGE | LARGE |
| SHUNT RESISTANCE 61 RESISTANCE VALUE | LARGE | NO CHANGE | SMALL |
| | SMALL | NO CHANGE | LARGE |
| BOOST COIL 62 INDUCTANCE | LARGE | NO CHANGE | LARGE |
| | SMALL | NO CHANGE | SMALL |
| EXTERNALLY CONNECTED FUEL INJECTION VALVE RESISTANCE VALUE | LARGE | LARGE | NO CHANGE |
| | SMALL | SMALL | NO CHANGE |

FUEL INJECTION SYSTEM FOR INTERNAL COMBUSTION ENGINE

TECHNICAL FIELD

The present invention relates to a booster circuit of a fuel injection system of an inter al combustion engine.

BACKGROUND ART

Examples of background art of the present field include JP 2011-247192 A. In this publication, in a booster circuit of a fuel injection system, the number of times of boost switching until restoration to a set voltage after a booster capacitor discharges is measured; and, when the criteria of a set number of times of switching is exceeded, drive of a fuel injection valve is permitted. It is not an object of this publication to carry out deterioration judgment, but is to wait for recovery of the capacitor having lowered capability in initial usage and restart operation of the booster circuit.

Moreover, examples of background art of the present field also include JP 2011-247192 A. In this publication, in a booster circuit of a fuel injection system, a steady-state value of a charge voltage for a booster capacitor is monitored. If it is normal, a fuel injection valve is driven by a control signal indicating a normal injection pulse width and injection timing; and, if it is not normal, the injection pulse width and injection timing are corrected. In this publication, the stead-state value is monitored for the charge voltage for the booster capacitor. However, since no change is generated in the steady-state value, it is difficult to detect the deterioration of the booster capacitor.

CITATION LIST

Patent Literature

PTL1: JP 2011-47192 A

SUMMARY OF INVENTION

Technical Problem

It is an object of the present invention to distinguish and detect capacity decrease due to deterioration or a broken wire of a booster capacitor and failure of a current monitor circuit, a coil, an externally connected fuel injection valve, etc. among malfunctions and characteristic changes of a booster circuit in the booster circuit used in fuel injection.

Solution to Problem

The object of the present invention can be achieved, for example, by monitoring charge/discharge of a booster capacitor.

Advantageous Effects of Invention

According to the present invention, capacity decrease due to deterioration or a broken wire of a booster capacitor and failure of a current monitor circuit, a coil, an externally connected fuel injection valve, etc. can be distinguished and detected among malfunctions and characteristic changes of a booster circuit in the booster circuit used in fuel injection.

BRIEF DESCRIPTION OF DRAWINGS

FIG. 9 is a method of distinguishing locations of malfunctions in the booster circuit.

DESCRIPTION OF EMBODIMENTS

Hereinafter, an embodiment according to the present invention will be described in detail based on drawings.

Figure 1:
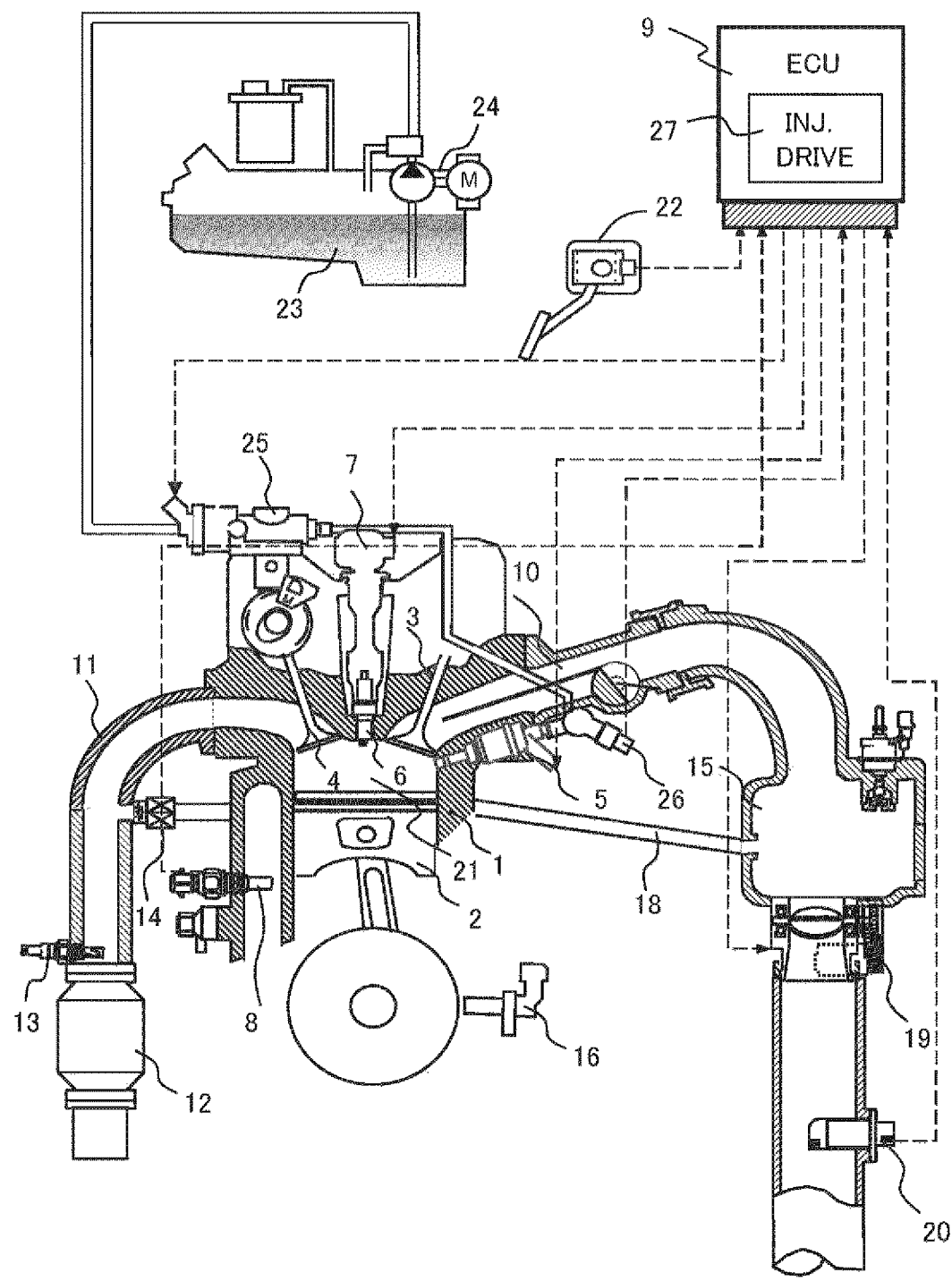
FIG. 1 shows an outline of a fuel injection system related to the present invention.

First, a configuration of an internal combustion engine system in which a fuel-injection controlling device according to the present embodiment is installed will be described by using FIG. 1. An engine 1 is provided with a piston 2, an air intake valve 3, and an air exhaust valve 4. Intake air passes through an air flow meter (AFM) 20, enters a throttle valve 19, and is supplied from a collector 15 serving as a branching part to a combustion chamber 21 of the engine 1 via an air intake pipe 10 and an air intake valve 3. Fuel is supplied from a fuel tank 23 to an internal combustion engine by a low-pressure fuel pump 24, and the pressure thereof is further increased by a high-pressure fuel pump 25 to a pressure required for fuel injection. The fuel subjected to pressure increase by the high-pressure fuel pump 25 is injected and supplied from a fuel injection valve 5 to the combustion chamber 21 of the engine 1 and is ignited by an ignition coil 7 and an ignition plug 6. The pressure of the fuel is measured by a fuel pressure sensor 26.

An exhaust gas after combustion is discharged to an air exhaust pipe 11 via an air exhaust valve 4. The air exhaust pipe 11 is provided with a three-way catalyst 12 for exhaust gas purification. A fuel-injection controlling device 27 is built in an ECU (engine control unit) 9; and signals of a crank angle sensor 16 of the engine 1, air-volume signals of the AFM 20, signals of an oxygen sensor 13 which detect the oxygen concentration in the exhaust gas, an accelerator opening degree of an accelerator opening degree sensor 22, signals of a fuel pressure sensor 26, etc. are input thereto. The ECU 9, for example, calculates the torque required for the engine from the signals of the accelerator opening-degree sensor 22 and judges an idle state. The ECU 9 is provided with a rotating-speed detecting means, which computes an engine rotating speed from the signals of the crank angle sensor 16.

Moreover, the ECU 9 calculates an intake air volume required for the engine 1 and outputs an opening-degree signal corresponding to that to the throttle valve 19. Moreover, the fuel-injection controlling device 27 of the ECU 9 calculates a fuel quantity corresponding to the intake air volume, outputs a current for the fuel injection valve 5 to carry out fuel injection, and outputs an ignition signal to the ignition plug 6.

The air exhaust pipe 11 and the collector 15 are connected to each other by an EGR passage 18. An EGR valve 14 is provided at an intermediate part of the EGR passage 18. The opening degree of the EGR valve 14 is controlled by the ECU 9, and, in accordance with needs, the exhaust gas in the air exhaust pipe 11 is flowed back to the air intake pipe 10.

Figure 2:
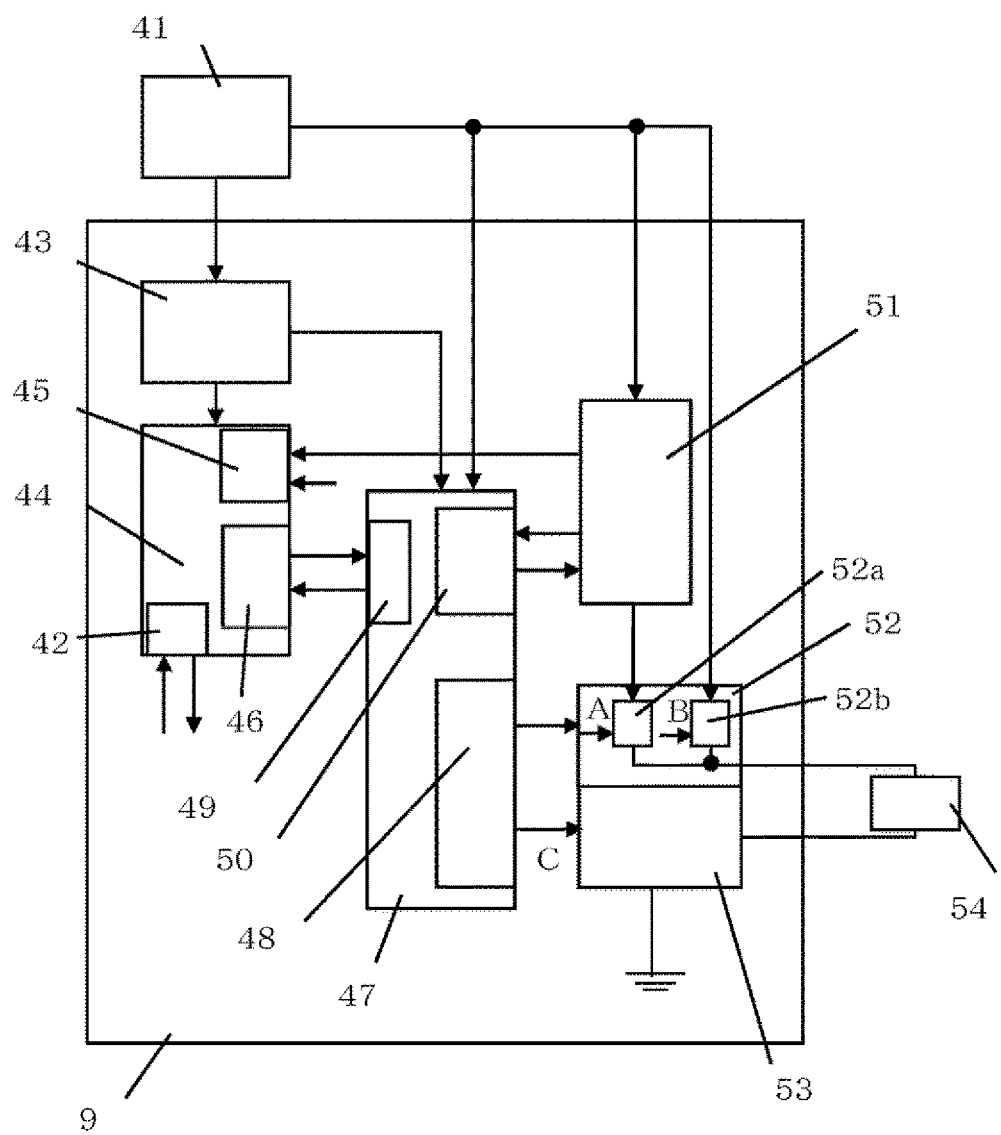
FIG. 2 is a control unit block diagram for carrying out the present invention.

FIG. 2 shows a circuit block diagram of fuel-injection-system drive circuit. A fuel injection system is generally built in the ECU 9 shown in FIG. 1. The voltage of a battery 41 is supplied to the ECU 9, and this voltage is supplied to a power source IC 43, a driver IC 47, a fuel-injection-system driving booster circuit 51, a high-side driver 52, etc. Moreover, voltages are supplied by the power source IC 43 to a microcomputer 44, the driver IC 47, etc. The driver IC 47 has a communication unit 49 for the microcomputer 44, a booster-circuit driving unit 50, and a driver driving unit 48. A switching signal is transmitted from the booster-circuit driving unit 50 to the booster circuit 51, and the voltage increased by the booster circuit is supplied to a high-side driver 52. Meanwhile, the voltage increased by the booster circuit 51 is fed back to the booster-circuit driving unit 50, and whether a switching signal is to be transmitted again or not is determined by the driver IC 47. Meanwhile, the voltage increased by the booster circuit 51 can be fed back to an A/D converter 45 of the microcomputer 44, and, based on an A/D value, a signal can be transmitted from a communication unit 46 in the microcomputer 44 to the driver IC 47. Meanwhile, other than boost voltages, signals from a fuel pressure sensor, a temperature sensor, etc. can be input to and monitored by the A/D converter owned by the microcomputer 44. Other than that, the microcomputer 44 has an input/output port 42, which drives an external load and/or monitors signals from outside. The high-side driver 52 can obtain power supplies from the booster circuit 51 and the battery 41 and has a driver 52a driven by the boost voltage and a driver 52b driven by the battery voltage. It has a role to cause a current to flow to a load 54, which has a coil, by drive signals (A, B) of the driver driving unit 48. A low-side driver 53 has a role to cause the current from the load 54, which has the coil, to flow to a ground electric potential by a drive signal (C) from the driver driving unit 48. Meanwhile, either one of or both of the high-side driver 52 and the low-side driver 53 has a current detecting function and a terminal voltage detecting function using a shunt resistance, etc., wherein driver driving is carried out by detecting the values of the currents which flow to the driver and the load 54 and feeding back the current values. Meanwhile, by these functions, overcurrent to the driver, power-source short circuit and ground short circuit of terminals can be also detected. Herein, the booster circuit 51, the high-side driver 52, and the low-side driver 53 may be provided inside or outside the driver IC 47, and the driver IC 47 may be used as either role as a driver or a pre-driver.

Figure 3:
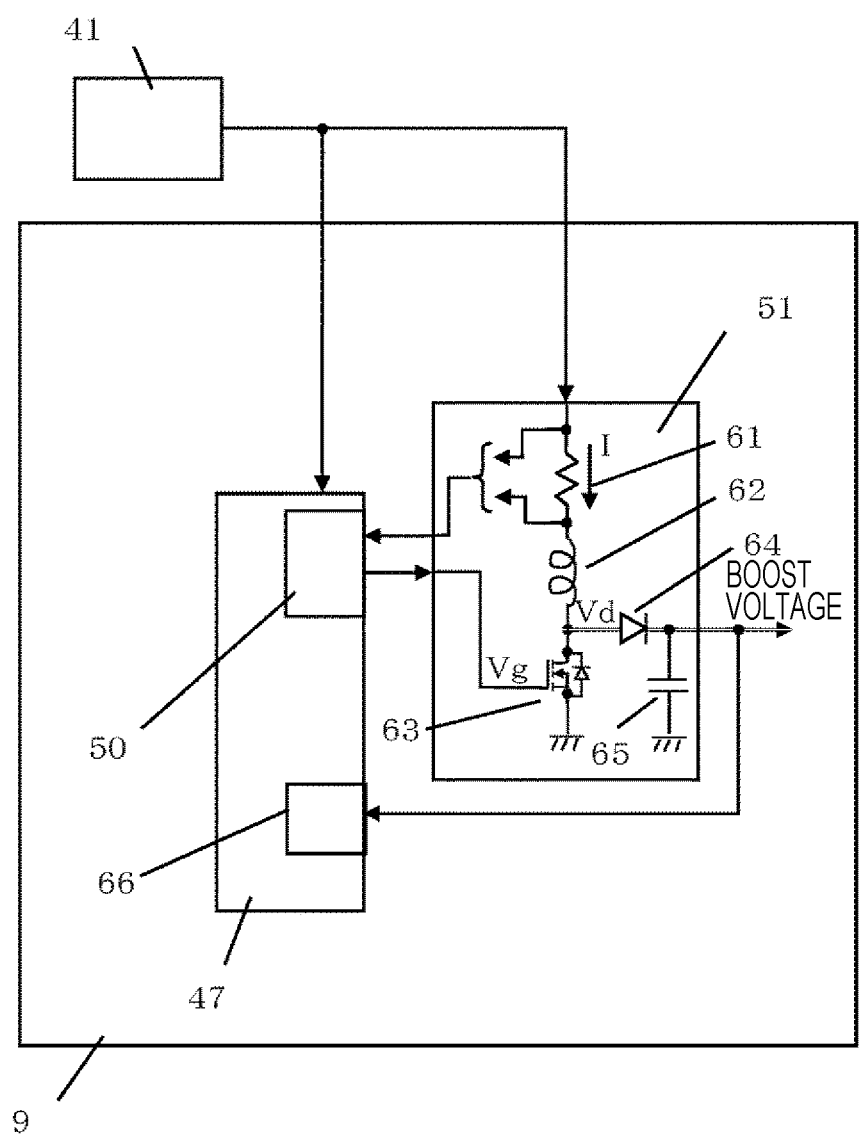
FIG. 3 is a circuit block diagram of boost voltage generation.
Figure 4:
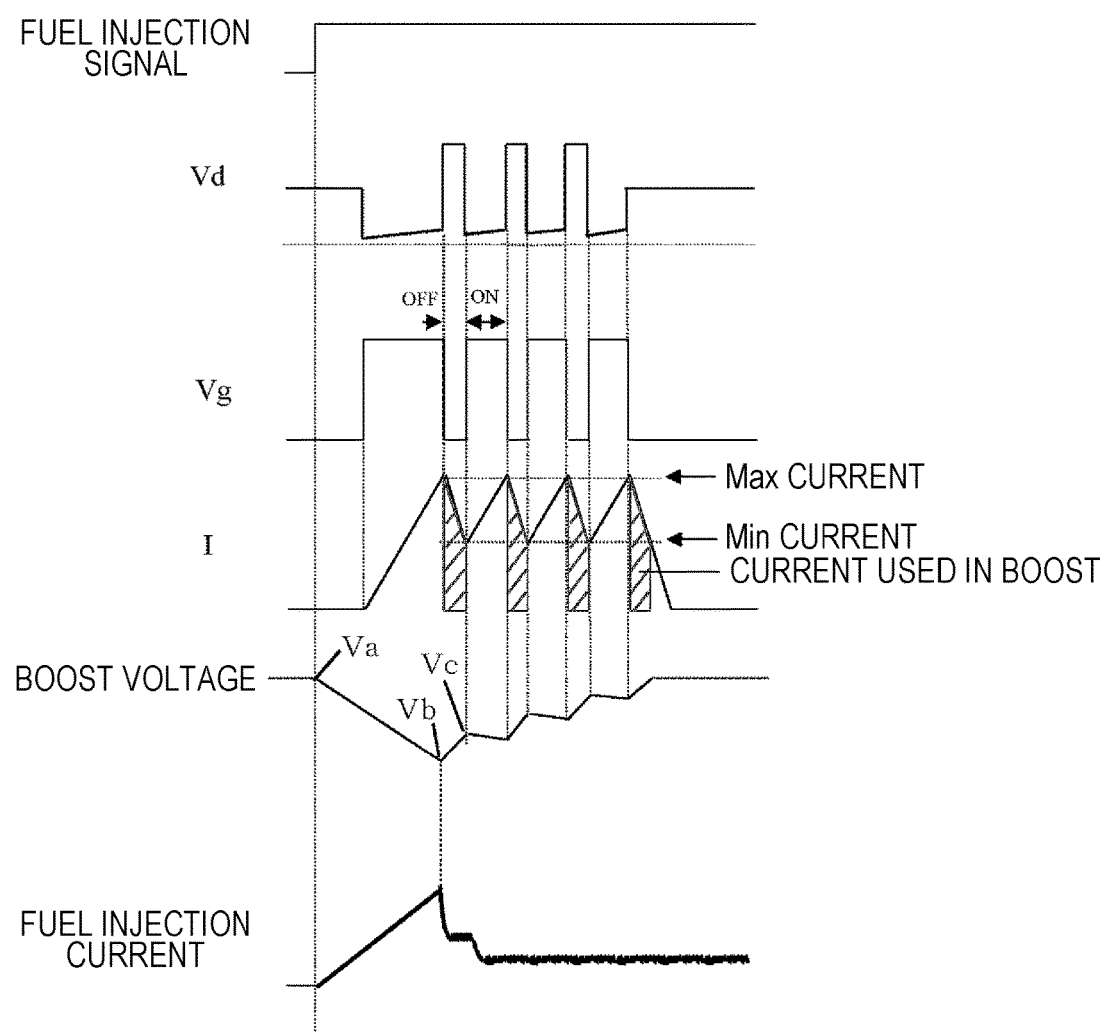
FIG. 4 shows voltage and current waveforms of boost voltage generation.

FIG. 3 is a diagram describing details of the booster circuit 51. When a gate voltage Vg of a booster driver 63 is turned on, a current I flows from the battery 41 to GND via a shunt resistance 61, a booster coil 62, and the booster driver 63. The current at this point is detected as a both-end voltage of the shunt resistance 61 by the booster-circuit driving unit 50. When a set maximum current value is detected, the booster driver 63 is turned off. At that point, the current I flows to a booster diode 64 because of back electromotive force of the booster coil 62. A booster capacitor 65 functions to temporarily store the current, which has flowed to the diode. Then, when the current flowing through the shunt resistance 61 becomes small, the booster driver 63 is turned on again, and the current value is increased. By repeating this, the current is kept flowing to the booster diode 64 and storing the current in the booster capacitor 65, thereby generating a boost voltage. Moreover, a circuit 66 which monitors the boost voltage is provided in the booster circuit; wherein, voltage boosting is carried out when the voltage is low, and the boost voltage is monitored in order to stop voltage boosting when the voltage reaches a predetermined value. The waveforms of a voltage boosting operation are shown by a diagram in FIG. 4. The gate signal for turning on the booster driver 63 is Vg. When this is turned on, a drain voltage Vd of the booster driver 63 is reduced to the vicinity of 0 V, and the current I is increased. When the current I reaches the set Max current, the gate signal Vg of the booster driver 63 is turned off. At that point, Vd reaches a voltage equivalent to the boost voltage, the current I flows to the booster diode 64 side and is stored in the booster capacitor 65; however, the current value per se is reduced along with time. Since the booster driver 63 is turned on again when the current reaches a set Min current, the operation of FIG. 4 is carried out by repeating this operation. This operation is carried out until the boost voltage reaches a set value. Note that hatched parts in the diagram represent the currents which actually flow through the booster diode 64 and represent the currents which are used in boosting. When this operation is carried out, the booster circuit has a waveform like that of the boost voltage of FIG. 4. When injection to a fuel drive valve is started, the boost voltage is reduced until a fuel injection current reaches a peak current. After the fuel injection current reaches the peak current, the boost voltage is not used. Therefore, the boost voltage is gradually recovered by switching drive of the booster circuit. When Vg is off, the current flows to the booster capacitor, and the boost voltage is therefore increased. When Vg is on, the current does not enter the booster capacitor, and the boost voltage is therefore not increased (is slightly reduced since natural discharge is carried out). Voltage boosting is carried out by Vg switching until the boost voltage becomes a predetermined value as a result of the repetition thereof.

It is an object of the present invention to check the deterioration state of the booster circuit by monitoring the movement in the boost voltage.

Figure 5:
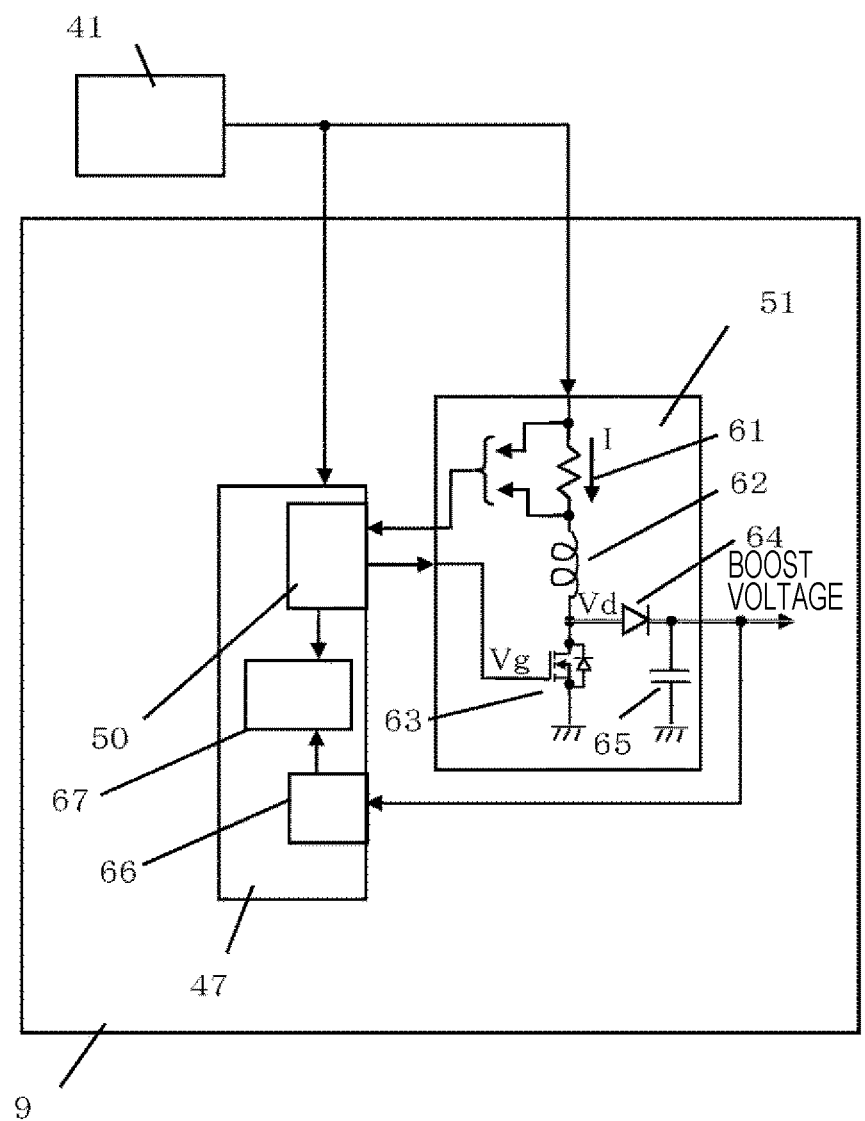
FIG. 5 shows a booster circuit configuration of the present invention.
Figure 6:
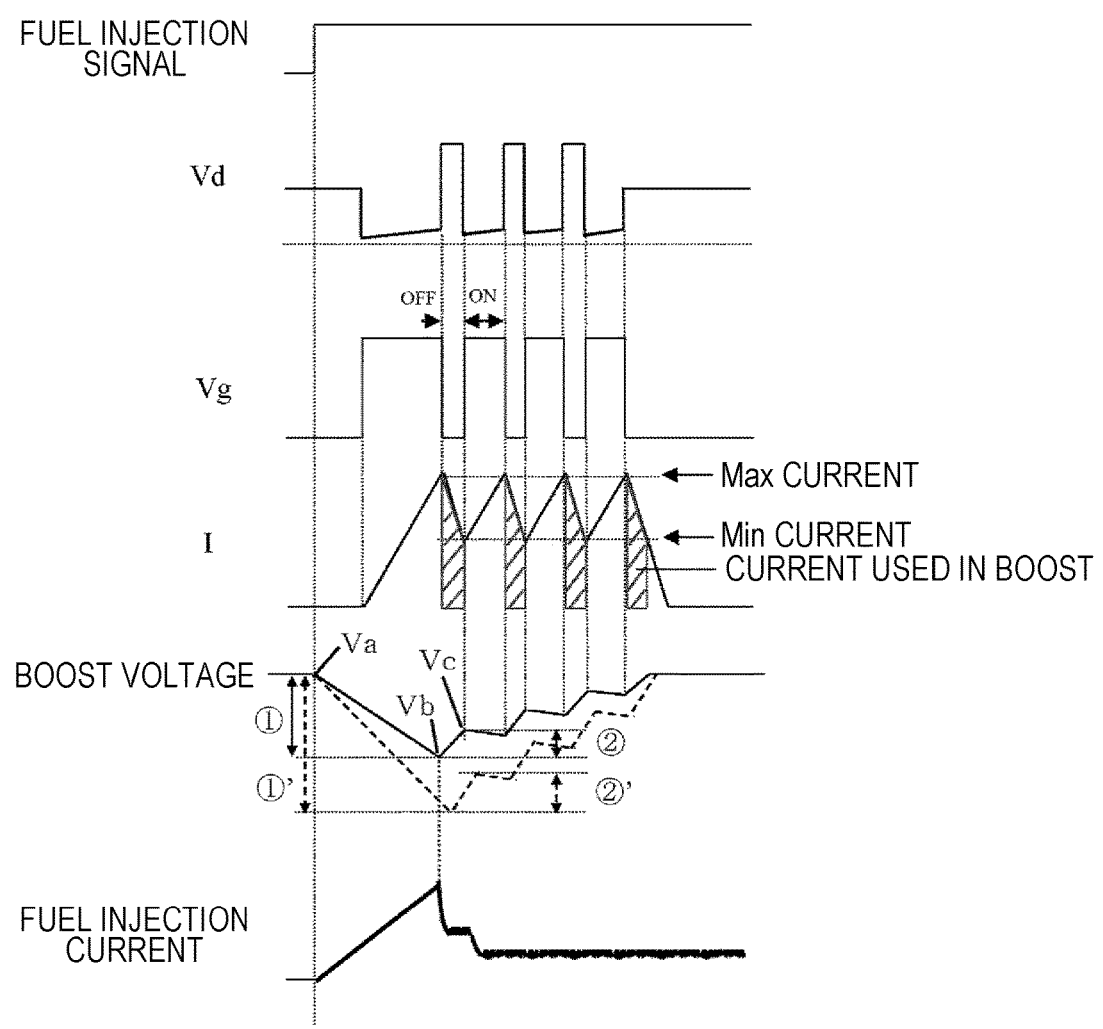
FIG. 6 shows boost voltage waveforms in a case in which a booster capacitor is deteriorated.

FIG. 5 and FIG. 6 are diagrams described as embodiments of claims 1 to 3 of the present invention. FIG. 5 is a diagram in which a determination unit 67 for read boost signals and boost voltages is provided with respect to FIG. 3. The determination unit 67 is provided inside or outside the driver IC 47 and is a part which monitors and diagnoses differences in the boost voltage and on/off drive of the booster circuit two times at measurement points. In FIG. 6, a boost voltage waveform of a case in which the capacity of the booster capacitor 65 has been reduced is added to FIG. 4 (broken line in the diagram). If the capacity is reduced due to deterioration or a broken wire of the booster capacitor 65, the range of reduction of the boost voltage in valve opening of the fuel injection valve is increased (normal case (1)→capacity reduced case (1)'). When it is reduced largely from that of the normal case, diagnosis is carried out by reading the difference between a voltage Va of a point when injection of the fuel injection valve is started and a boost voltage Vb of a point when the current to the fuel injection valve reaches the peak.

Then, after the current to the fuel injection valve reaches the peak, a boost-voltage restoring operation is started; wherein, the voltage Vb of a point immediately before the booster driver 63 is turned off in order to check the voltage value increased by one time of switching and a voltage Vc at a point it is turned on are monitored. The difference is increased if the capacity is reduced due to deterioration or a broken wire of the booster capacitor 65 (normal case (2)→capacity reduced case (2)'). As a result of reading the booster voltage difference therebetween, if the difference has been largely increased from the normal case, diagnosis is carried out.

Figure 7:
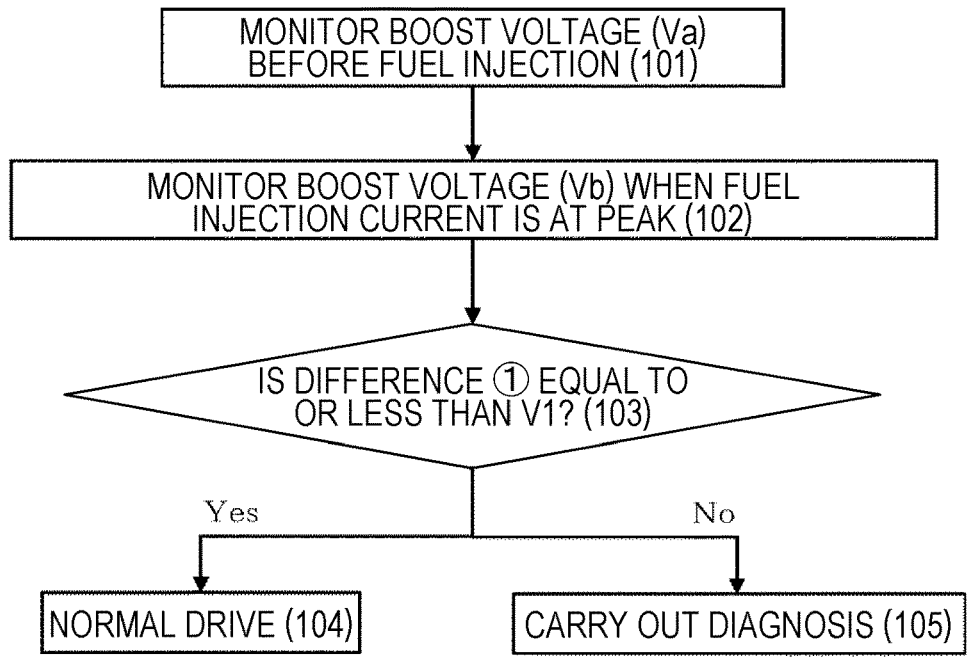
FIG. 7 is a flow chart of a method of monitoring the range of decrease in boost voltage when a fuel injection valve is opened.
Figure 8:
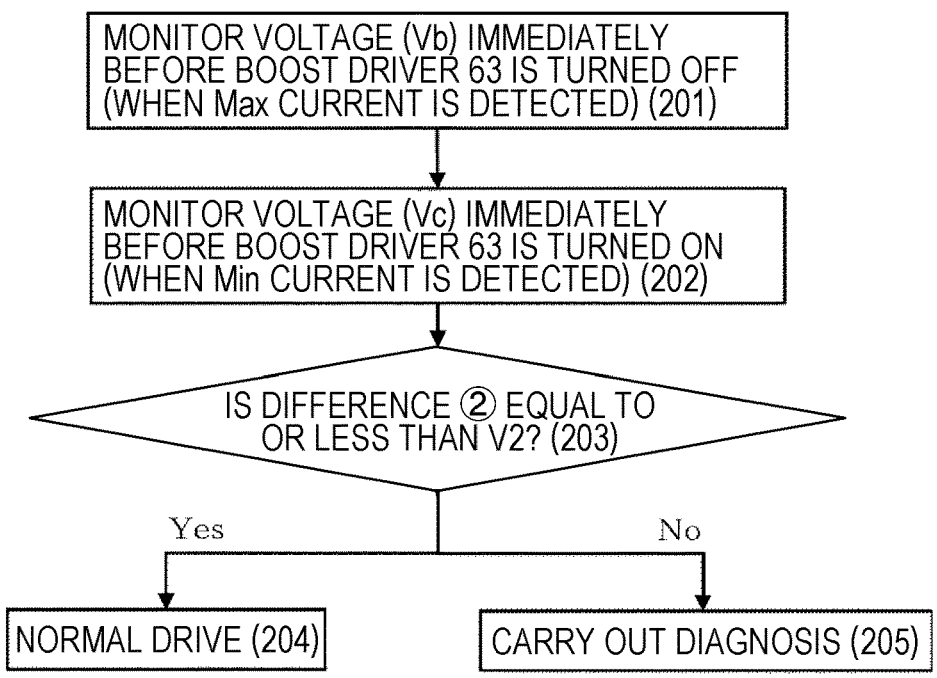
FIG. 8 is a flow chart of a method of monitoring the range of increase in boost voltage per 1 boost switching.

FIG. 7 and FIG. 8 are flow charts of the contents of the description in FIG. 6. In FIG. 7, the boost voltage Va before fuel injection is monitored (101), and the boost voltage Vb at the point when the fuel injection current reaches the peak is monitored (102). Then, the difference (1) is obtained (103). If the difference is equal to or less than a predetermined value V1, normal drive is carried out (104). If the difference is equal to or more than V1, diagnosis is carried out (105). In FIG. 8, the voltage Vb at the point immediately before the booster driver 63 is turned off (when Max current is detected) is monitored (201), and the voltage Vc at the point immediately before the booster driver 63 is turned on (when Min current is detected) is also monitored (202). Then, the difference (2) therebetween is obtained (203). If the difference is equal to or less than a predetermined value V2, normal drive is carried out (204). If the difference is equal to or more than V2, diagnosis ms carried out (205).

When the measurement method as described above is carried out, diagnosis can be carried out when there is a difference from a normal case. In a case of a diagnosis method by FIG. 7 or FIG. 8, distinguishment from deterioration and characteristic variations of other elements cannot be made in some cases. Therefore, when both of FIG. 7 and FIG. 8 are used, characteristic changes due to deterioration, broken wire, etc. of the booster capacitor 65 can be specified. A diagram thereof is shown in FIG. 9, and this is the diagram described as embodiments of claims 1 and 4. Examples of characteristic changes include, other than the capacity value of the booster capacitor 65, the resistance value of the shunt resistance 61 for current monitoring, inductance of the booster coil 62, and the resistance value of an externally-connected fuel injection valve. The changes of the voltage (1) and voltage (2) in the cases in which the numerical values thereof become large or small are shown in the diagram. For example, if the change of the voltage (1) is larger than that in the normal operation and is larger than the threshold value V1 and if the change of the voltage (2) is larger than that in the normal operation and is larger than the threshold value V2 it can be distinguished as abnormality (deterioration, broken wire, etc.) of the booster capacitor 65. Moreover, if the change of the voltage (1) is not different from that in the normal operation, but the change of the voltage (2) is larger than that in the normal operation and is larger than the threshold value V2, the resistance value of the shunt resistance 61 has been reduced, or the inductance of the booster coil 62 has been increased. In this manner, if either one of (1) and (2) is monitored, there is a part that cannot be distinguished from other characteristic changes. However, if both of (1) and (2) are monitored, it can be distinguished from the other characteristic changes. (Effects of the Invention) As described above, according to the present invention, in a fuel injection system of an internal combustion engine driven to be opened/closed by a boost voltage higher than a battery voltage and by the boost voltage, the system having a drive circuit configured to control electric power distribution to a coil driven to open/close a fuel injection valve, the range of decrease in the boost voltage when the fuel injection valve is opened and the range of increase per 1 switching carried out for restoring the boost voltage are monitored. As a result, malfunctions and characteristic changes of the booster circuit can be detected, and, among them, capacity decrease due to deterioration or a broken wire of the booster capacitor and malfunctions and characteristic changes of the current monitor circuit, the coil, and the externally connected fuel injection valve, etc. can be distinguished and detected.

REFERENCE SIGNS LIST

1 engine
2 piston
3 air intake valve
4 air exhaust valve
5 fuel injection valve
6 ignition plug
7 ignition coil
8 water temperature sensor
9 ECU (Engine Control Unit)
10 air intake pipe
11 air exhaust pipe
12 three-way catalyst
13 oxygen sensor
14 EGR valve
15 collector
16 crank angle sensor
18 EGR passage
19 throttle valve
20 AFM
21 combustion chamber
22 accelerator opening-degree sensor
23 fuel tank
24 low-pressure fuel pump
25 high-pressure fuel pump
26 fuel pressure sensor
27 fuel-injection controlling device
41 battery
42 input/output port of microcomputer
43 power source IC
44 microcomputer
45 A/D converter
46 communication unit in microcomputer
47 driver IC (or pre-driver)
48 driver driving unit
49 communication unit in driver IC
50 booster-circuit driving unit
51 booster circuit
52 high-side driver
53 low-side driver
54 coil load (fuel injection system)
61 shunt resistance
62 booster coil
63 booster driver
64 booster diode
65 booster capacitor
66 boost-voltage monitoring circuit
67 determination unit for boost voltage

The invention claimed is:
1. An electronic control system comprising:
an electronic control device;
a drive circuit; and
a booster circuit operatively coupled to the drive circuit, wherein
the drive circuit is configured to control electric power distribution to a coil,
the coil is configured to be driven to thereby open/close a fuel injection valve,
the booster circuit includes
a boosting switch element configured to generate a boost voltage higher than a battery voltage,
a coil,
a current monitor circuit,
a diode, and
a booster capacitor configured to store the boost voltage,
the electronic control device is configured to determine whether a failure is caused by deterioration or by a change or malfunction of a resistance value,
the electronic control device bases the failure determination on: i) a range of decrease in the boost voltage in fuel injection relative to a predetermined value, and ii) a range of increase in the voltage per 1 switching of the booster circuit driven for restoring the boost voltage relative to the predetermined value, the electronic control device is configured to perform two comparisons, a first comparison in which the range of decrease is compared with a first voltage value, and a second comparison in which the range of increase is compared with a second threshold value, and the failure determination is further based on the two comparisons.

2. The electronic control system of claim 1, wherein failure is determined as being caused by deterioration or a broken wire in the booster capacitor when:

the range of decrease in the boost voltage results in decreased fuel injection, and the range of increase in the voltage per 1 switching of the booster circuit driven for restoring the boost voltage results in decreased fuel injection.

3. The electronic control system of claim 1, wherein failure is determined as being caused by a change or malfunction of a resistance value of the boost-current monitor circuit or inductance of the booster coil when:

the range of increase in the voltage per 1 switching of the booster circuit driven for restoring the boost voltage results in decreased fuel injection.

4. The electronic control system of claim 1, wherein failure is determined as being caused by a change or malfunction of a resistance value of a resistance of the externally connected fuel injection value when:

the range of decrease in the boost voltage results in decreased fuel injection.

5. An electronic control system comprising:

an electronic control device;

a drive circuit; and a booster circuit operatively coupled to the drive circuit, wherein the drive circuit is configured to control electric power distribution to a coil, the coil is configured to be driven to thereby open/close a fuel injection valve, the booster circuit includes a boosting switch element configured to generate a boost voltage higher than a battery voltage, a coil, a current monitor circuit, a diode, and a booster capacitor configured to store the boost voltage, the electronic control device is configured to determine whether a failure is caused by deterioration or by a change or malfunction of a resistance value, the electronic control device bases the failure determination on a range of decrease in the boost voltage in fuel injection and on a range of increase in the voltage per 1 switching of the booster circuit driven for restoring the boost voltage, wherein failure is determined as being caused by a change or malfunction of a resistance value of the boost-current monitor circuit or inductance of the booster coil when: the range of increase in the voltage per 1 switching of the booster circuit driven for restoring the boost voltage results in decreased fuel injection.

6. The electronic control system of claim 5, wherein failure is determined as being caused by deterioration or a broken wire in the booster capacitor when:

the range of decrease in the boost voltage results in decreased fuel injection, and the range of increase in the voltage per 1 switching of the booster circuit driven for restoring the boost voltage results in decreased fuel injection.

7. The electronic control system of claim 5, wherein failure is determined as being caused by a change or malfunction of a resistance value of a resistance of the externally connected fuel injection value when:

the range of decrease in the boost voltage results in decreased fuel injection.

* * * * *